US011127395B1

(12) United States Patent
Borja Jaramillo

(10) Patent No.: US 11,127,395 B1
(45) Date of Patent: Sep. 21, 2021

(54) DEVICE-SPECIFIC SKILL PROCESSING

(71) Applicant: Amazon Technologies, Inc., Seattle, WA (US)

(72) Inventor: Andres Felipe Borja Jaramillo, Shoreline, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/987,498

(22) Filed: May 23, 2018

(51) Int. Cl.
*G10L 15/18* (2013.01)
*G10L 15/30* (2013.01)
*G10L 15/22* (2006.01)

(52) U.S. Cl.
CPC .......... *G10L 15/1815* (2013.01); *G10L 15/22* (2013.01); *G10L 15/30* (2013.01); *G10L 2015/223* (2013.01)

(58) Field of Classification Search
CPC . G10L 15/18; G10L 15/1807; G10L 15/1815; G10L 15/1822; G10L 15/183; G10L 15/187; G10L 15/19; G10L 15/193; G10L 15/197; G10L 15/20; G10L 15/22; G10L 15/24; G10L 15/25; G10L 15/26; G10L 15/265; G10L 15/30; G10L 2015/221; G10L 2015/222; G10L 2015/223; G10L 2015/225; G10L 2015/226; G10L 2015/227; G10L 2015/228; G10L 15/00; G10L 15/08; G10L 15/081; G10L 15/083; G10L 15/085; G10L 15/12; G10L 15/32; G10L 15/28; G10L 15/34

USPC .......... 704/9, 251, 252, 253, 254, 255, 257, 704/E15.018, 235
See application file for complete search history.

(56) References Cited

U.S. PATENT DOCUMENTS

| | | | | |
|---|---|---|---|---|
| 6,975,993 B1* | 12/2005 | Keiller | .................... | G10L 15/26 704/275 |
| 7,295,981 B1* | 11/2007 | Gupta | .................. | G10L 15/063 704/257 |
| 7,480,619 B1* | 1/2009 | Scott | ............................ | 704/275 |
| 8,346,563 B1* | 1/2013 | Hjelm | ................. | G10L 15/1822 379/88.01 |
| 8,892,446 B2* | 11/2014 | Cheyer | ............... | G06F 16/3344 704/275 |
| 9,070,366 B1* | 6/2015 | Mathias | .................. | G10L 15/26 |
| 9,378,740 B1* | 6/2016 | Rosen | ................. | G10L 15/1822 |
| 9,484,021 B1* | 11/2016 | Mairesse | ................. | G10L 15/08 |
| 9,484,030 B1* | 11/2016 | Meaney | .................. | G10L 15/22 |
| 9,996,531 B1* | 6/2018 | Parastatidis | ........... | G06F 17/279 |

(Continued)

*Primary Examiner* — Leshui Zhang
(74) *Attorney, Agent, or Firm* — Pierce Atwood LLP

(57) ABSTRACT

Techniques for configuring device-specific skills as top-level skills are described. When a system receives a user input the system performs NLU processing to determine an intent of the user input. In some instances, the system may identify a device-specific skill associated with the device interacted with by the user. At least partially in parallel to performing NLU processing to determine the intent of the user input, the system may also perform NLU processing to determine a likelihood that the user input corresponds to an intent actionable by the device-specific skill. Once the system has finished NLU processing, the system may implement one or more prioritization rules to determine whether the user input should be sent to the device-specific skill or another skill of the system.

20 Claims, 10 Drawing Sheets

(56) References Cited

U.S. PATENT DOCUMENTS

| | | | |
|---|---|---|---|
| 2012/0022854 A1* | 1/2012 | Hoshino | G06F 3/04883 |
| | | | 704/9 |
| 2014/0278435 A1* | 9/2014 | Ganong, III | G10L 15/22 |
| | | | 704/275 |
| 2014/0365209 A1* | 12/2014 | Evermann | G06F 17/279 |
| | | | 704/9 |
| 2016/0148612 A1* | 5/2016 | Guo | G06F 17/27 |
| | | | 704/257 |
| 2016/0217124 A1* | 7/2016 | Sarikaya | G06F 17/2765 |
| 2019/0019504 A1* | 1/2019 | Hatambeiki | G10L 15/22 |
| 2019/0020493 A1* | 1/2019 | Arling | G06F 3/167 |
| 2019/0130904 A1* | 5/2019 | Homma | G10L 15/26 |
| 2019/0172465 A1* | 6/2019 | Lee | G10L 15/22 |
| 2021/0026593 A1* | 1/2021 | Wang | G06F 3/167 |

\* cited by examiner

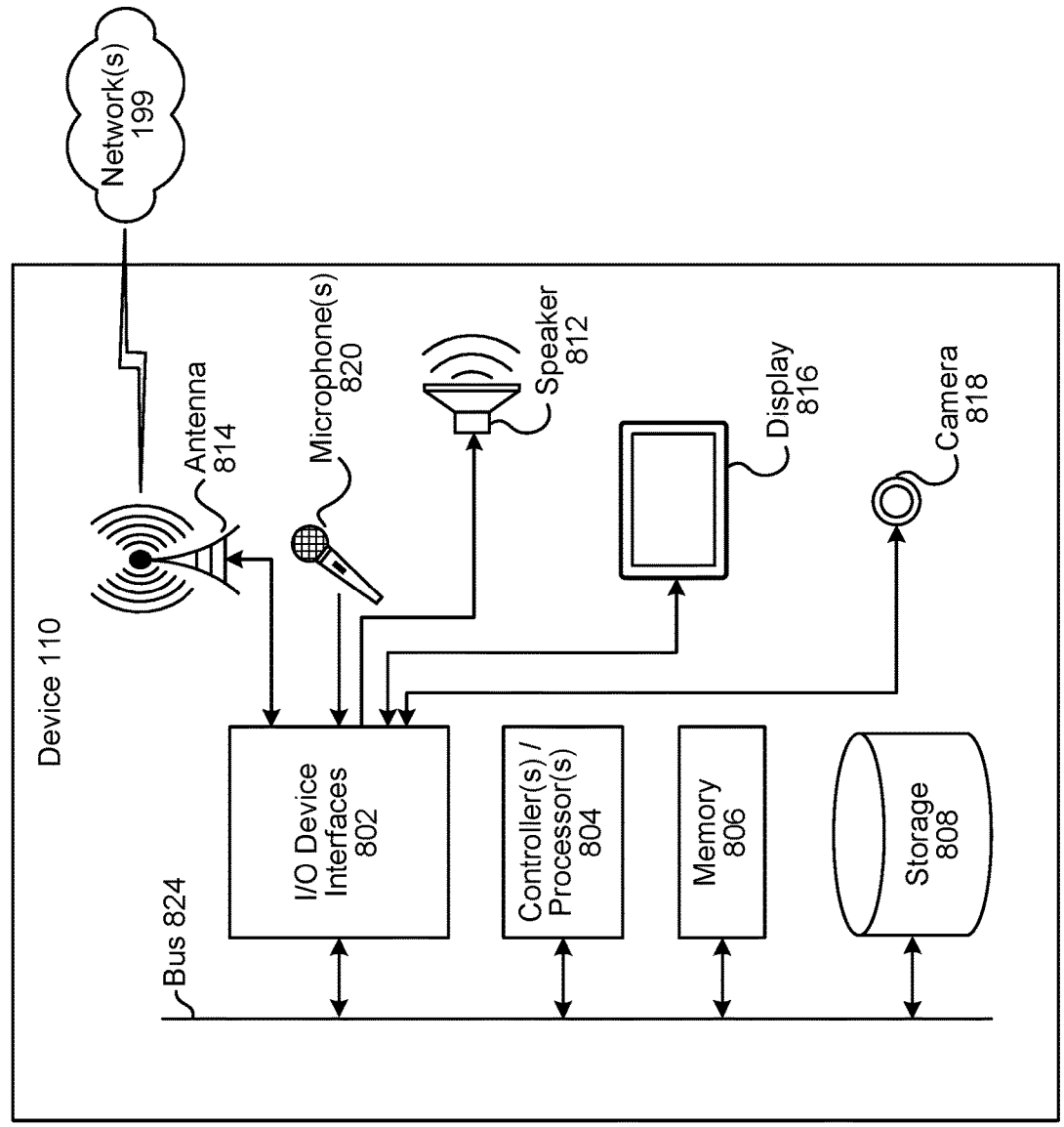

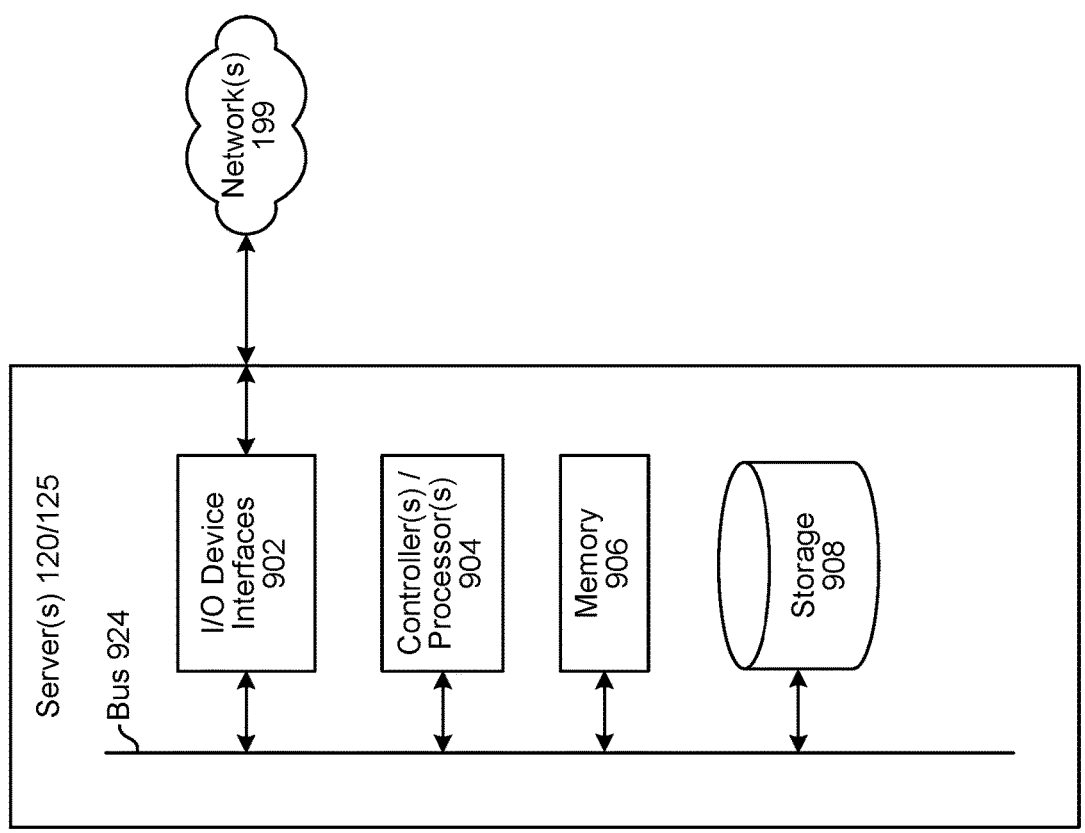

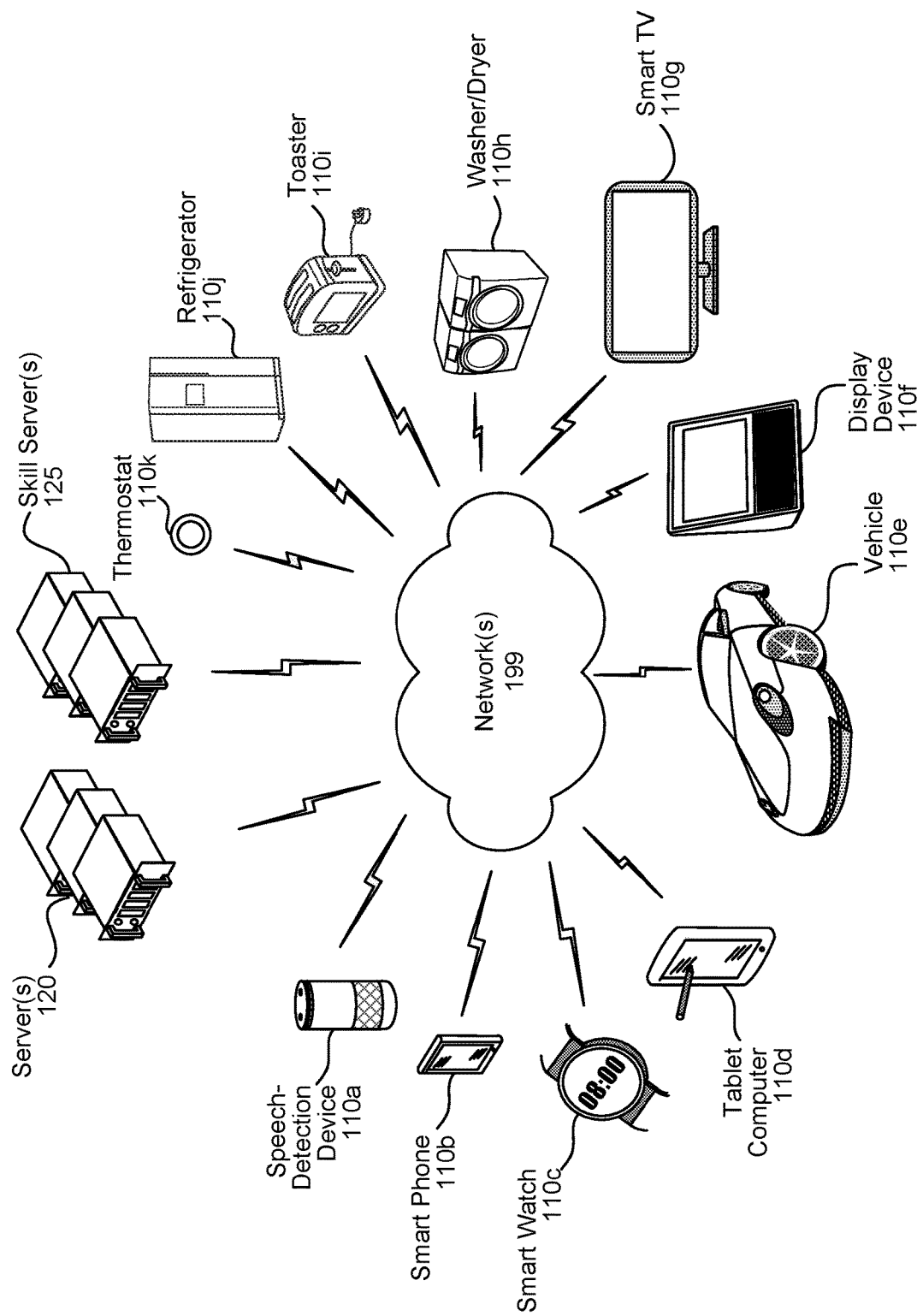

US 11,127,395 B1

DEVICE-SPECIFIC SKILL PROCESSING

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to skills.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 8 is a block diagram conceptually illustrating example components of a device according to embodiments of the present disclosure.

FIG. 9 is a block diagram conceptually illustrating example components of a server according to embodiments of the present disclosure.

FIG. 10 illustrates an example of a computer network for use with the speech processing system.

DETAILED DESCRIPTION

Figure 1:
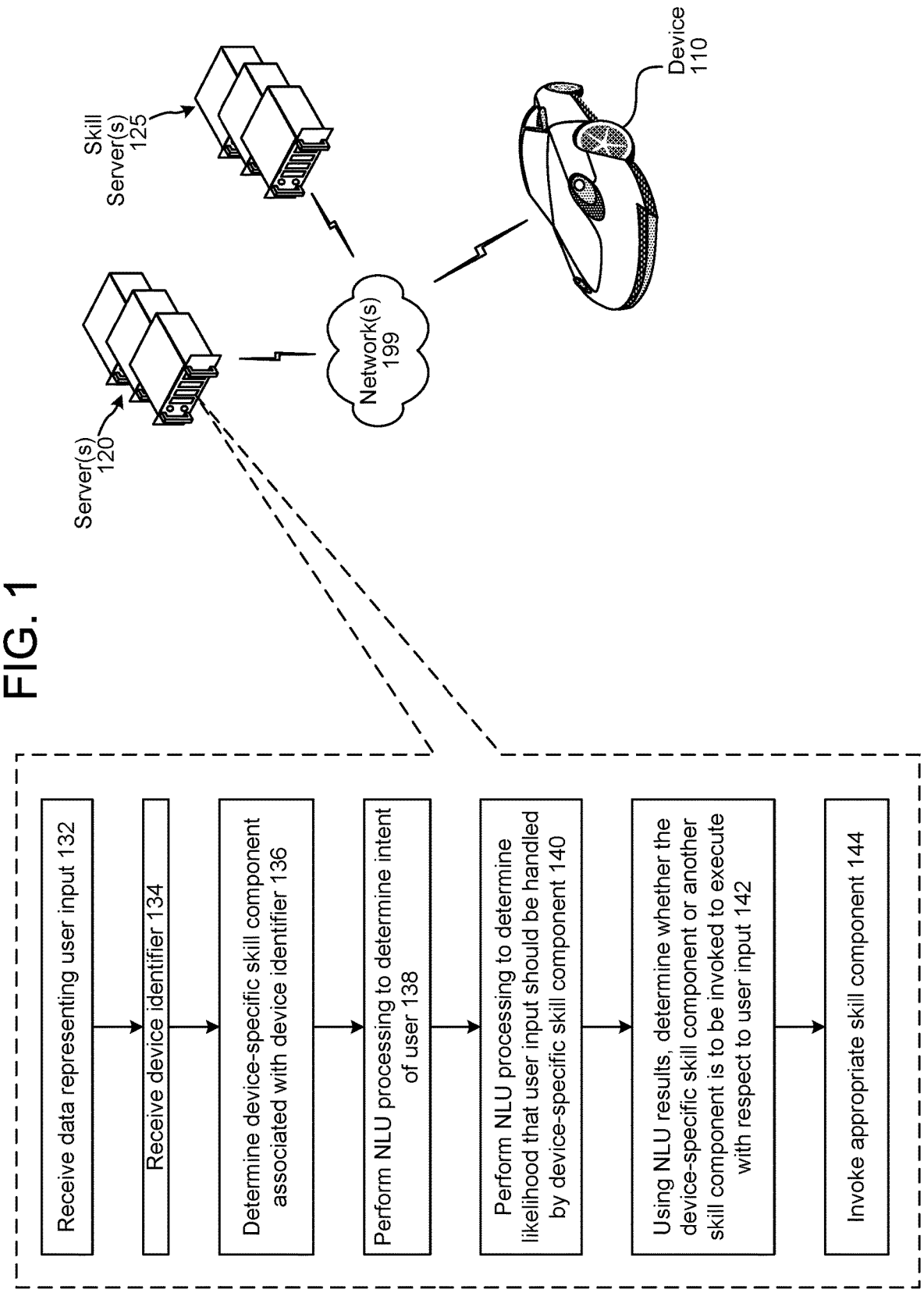
FIG. 1 illustrates a system configured to process user inputs according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

A user may speak an input to a system and the system may perform an action. For example, the system may output music, images, video, or other content responsive to the user input; may provide an answer to a question asked by the user; may interact with third party systems to cause ride sharing trips to be booked; etc.

Such systems may implement one or more skill, which are voice-controlled applications as explained below. Each skill may enable the system to perform certain functionality. For example, a weather skill may enable a system to provide users with weather information, a music skill may enable a system to output music to users, a video skill may enable a system to display videos to users, etc.

A system may be configured with what may be referred to as top-level skills. A user may invoke a top-level skill without explicitly referring to the skill in the user input. For example, a weather skill may be a top-level skill. A user may say "Alexa, what is the weather." In response, the system may invoke the weather skill to provide weather information, even though the user did not explicitly refer to the weather skill in the user input, meaning, the user did not need to say "Alexa, ask the weather skill what is the weather" as the speech processing operations may be able to determine which skill to invoke in response to the user input.

A system may also be configured with non-top-level skills. A user may need to explicitly refer to a non-top-level skill in a user input in order to cause the system to invoke the particular non-top-level skill to perform an action responsive to the user input. For example, the system may be configured with a top-level "Weather A" skill and a non-top-level "Weather B" skill. To cause the non-top-level "Weather B" skill to be invoked instead of the top-level "Weather A" skill, a user may need to explicitly refer to the non-top-level "Weather B" skill in the user input, for example by saying "Alexa, ask Weather B what is the weather for tomorrow."

Systems implementing virtual assistants may include various types of user-facing devices. Such a system may include appliances, vehicles, thermostats, speakers, televisions, and other devices that are capable of interfacing with system components to enable users to speak commands to the system via the devices.

Such devices may include device-specific functionality. For example, a vehicle may be configured with functionality such as climate control, controlling movement of windows, etc. For further example, a thermostat may include functionality such as setting a specific temperature, setting a specific temperature for a certain time period, etc. In a still further example, an oven may include functionality such as preheating the oven, a timer, etc.

A user may provide a user input to a device requesting an action specific to the device be performed. For example, a user may say to a vehicle "Alexa, turn on my air conditioning to high." Depending on the system configuration, however, such a request may be routed to a central location or component of the system and may be interpreted as a general, rather than a device-specific command. Thus, if the user has an air conditioning system in their home that is controllable by the system, the foregoing user input may result in the home's air conditioning being turned on, even though the user desired the vehicle's air conditioning to be turned on, due to the home air conditioner being configured as a default (or top-level) way for the system to handle air conditioning requests. Thus, in certain configurations, if a user does not specify the desired device to execute a command, the system may execute the command using the incorrect device. Alternatively, the system may require further user input to clarify which air conditioning device (e.g., that of the vehicle or the house) should be turned on. Neither results in a desired user experience.

The present disclosure configures device-specific skills as top-level skill. This enables user inputs relating to device-specific functionality to be properly routed to device-specific skills without requiring a user to explicitly refer to the device-specific skills in the user inputs. The present disclosure improves the functioning of a system because the teachings herein improve the probability of a system properly routing user inputs to appropriate skills without requiring additional clarifying user input.

A device-specific skill is software and/or hardware configured to take instructions from the system and send them to a device associated with the device-specific skill. A device-specific skill may reside with the system, in a cloud environment, on the device associated with the device-specific skill, or some other computing environment in communication with but not on the device. A device-specific skill may act as an intermediary between a speech processing system and the device. A device-specific skill may receive input from the speech processing system and send output to the device to execute the specific functionality. A device-specific skill may be configured to handle any of the voice-enabled commands executable by a particular device associated with the device-specific skill.

When a system receives a user input, the system may also receive a device identifier representing the device the user is interacting with. The system performs NLU processing on text data, representing the user input, to determine an intent of the user input. Knowing the device, the system may identify a device-specific skill associated with the device identifier. For example, if the device identifier represents the device is associated with a particular vehicle manufacturer, the system may determine a skill associated with the vehicle manufacturer. At least partially in parallel to performing NLU processing on the text data to determine the intent of the user input, the system may also perform NLU processing the text data to determine a likelihood that the user input corresponds to an intent actionable by the device-specific skill. Once the system has finished NLU processing, the system may implement one or more prioritization rules to determine whether the user input should be sent to the device-specific skill or another skill of the system.

The system may be configured with a default skill for all devices (e.g., all vehicles, appliances, and other devices that may implement functionality of the present disclosure). The system may alternatively be configured such that each type of device is associated with a particular default skill. For example, the system may be configured with a vehicle skill associated with all vehicles, an appliance skill associated with all appliances, etc.

A device may be associated with a particular default skill. The default skill with which a device is associated may be specified based on device type, device manufacturer, or user preference. A user may re-assign a default skill with which a device is associated using a companion application, a user interface provided by the device, a voice user interface, etc.

At runtime, the default skill with which a device is associated may be determined based on: the system used to process the user input; the device that provided the system with the user input; a user profile associated with the device or user input; and/or device-side processing abilities.

FIG. 1 illustrates a system configured to process user inputs. Although the figures and discussion of the present disclosure illustrate certain operational steps of the system in a particular order, the steps described may be performed in a different order (as well as certain steps removed or added) without departing from the intent of the disclosure. A device 110 local to a user, one or more servers 120, and one or more skill servers 125 may communicate across one or more networks 199.

As illustrated, the device 110 is represented as a vehicle. One skilled in the art will appreciate that the device 110 may be a device other than a vehicle. For example, the device 110 may be an appliance, a thermostat, or another device user device.

A skill server(s) 125 may be located with or separate from the device 110. For example, a skill server(s) 125 may be located separate from the device 110 and maintained by a manufacturer of the device 110. Device manufacturers include vehicle manufacturers, appliance manufacturers, etc.

The user may provide the device 110 with user input. The user input may correspond to speech of the user, in which case the device 110 may generate audio data representing the speech. The user input may alternatively correspond to text, in which case the device 110 may generate text data representing the text. The device 110 may send data (e.g., audio data or text data) representing the user input to the server(s) 120. Alternatively, the device 110 may send the data representing the user input to the skill server(s) 125, which sends the data to the server(s) 120.

The device 110 may also send a device identifier, specific to the device 110, to the server(s) 120. Alternatively, the device 110 may send the device identifier to the skill server(s) 125, which sends the device identifier to the server(s) 120. The device identifier may include a model number of the device, a manufacturer's ID, a device serial number, or other type of identifier. The identifier may or may not be unique to the device but may be used by another component (such as the server(s) 120, skill server(s) 125, etc.) to identify the device 110 and/or its capabilities for purposes of performing speech processing.

The server(s) 120 receives (132) the data representing the user input from the device 110 or skill server(s) 125. The server(s) 120 also receives (134) the device identifier from the device 110 or the skill server(s) 125.

The server(s) 120 determines (136) a device-specific skill component associated with the device identifier. The system may store device profiles. A device profile may represent a device-specific skill component associated with the device. For example, a device profile may store a skill component identifier unique to the device-specific skill component associated with the device. The server(s) 120 may determine device profile data associated with the received device identifier and may determine the skill component identifier represented in the device profile data.

The server(s) 120 performs (138) NLU processing (on text data received from the device 110 or skill server(s) 125, or output as a result of ASR processing performed on audio data received from the device 110 or skill server(s) 125) to determine an intent of the user. In performing this NLU processing, an NLU component of the server(s) 120 may consider intents actionable by various skill components of the system.

The server(s) 120 also, at least partially in parallel to performing NLU processing at step 138, performs (140) NLU processing (on text data received from the device 110 or skill server(s) 125, or output as a result of ASR processing performed on audio data received from the device 110 or skill server(s) 125) to determine a likelihood that the user input should be handled by the device-specific skill component associated with the device identifier. In performing this NLU processing, an NLU component of the server(s) 120 may be limited to considering one or more intents actionable by the device-specific skill component.

The NLU component outputs NLU results based on the NLU processing performed at step 138 and NLU results based on NLU processing performed at step 140. Using one or more prioritization rules (discussed in detail below) and both of the NLU results, the server(s) 120 determines (142) whether the device-specific skill component or another skill component of the system is to be invoked to execute with respect to the user input. The server(s) 120 thereafter invokes (144) the appropriate skill component. Such invoking of a skill component may include the server(s) 120 sending, to the skill component, a portion of NLU results associated with the skill component.

Figure 2:
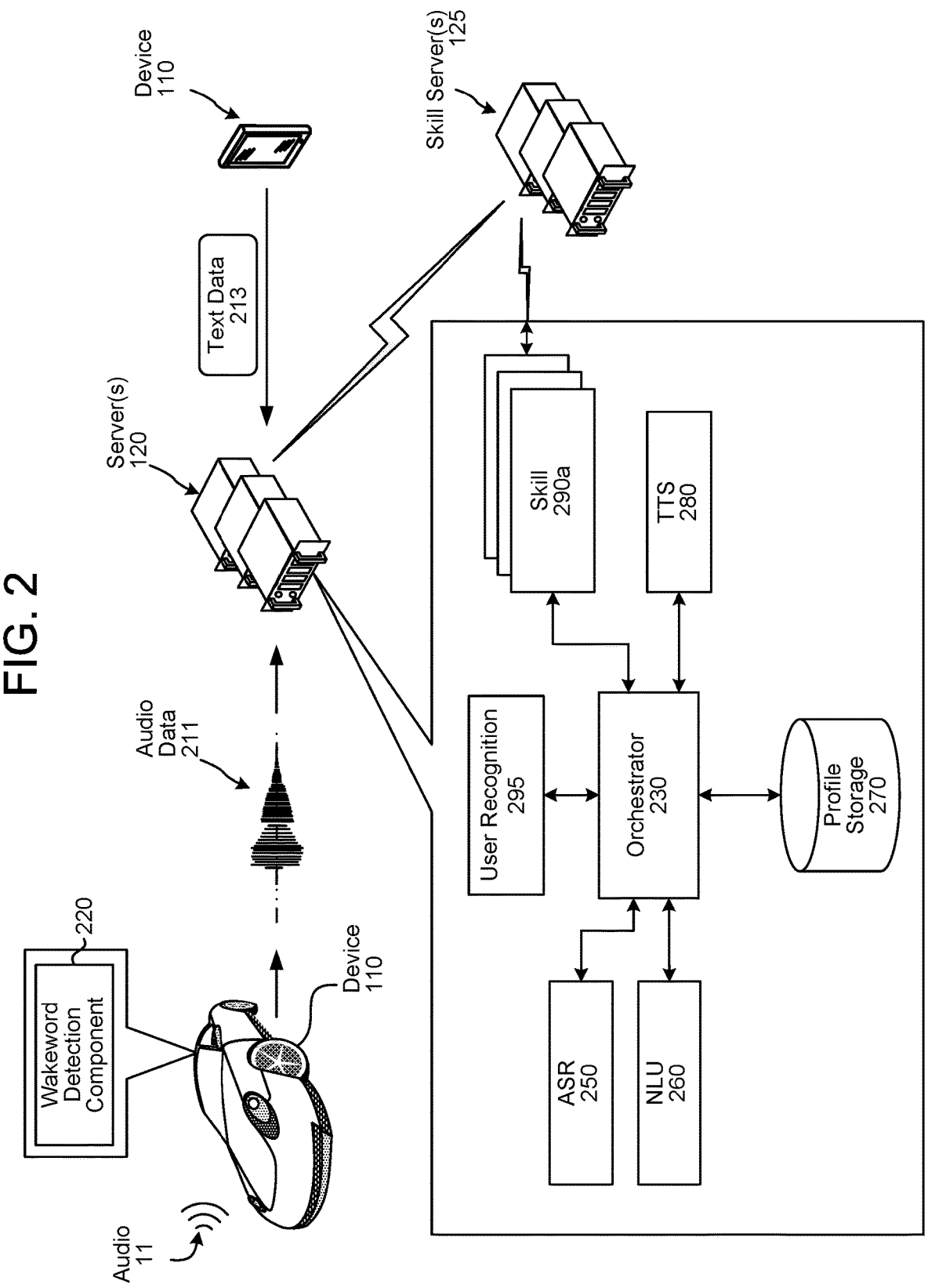
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120 (or to the skill server(s) 125 which sends the audio data to the server(s) 120). The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, either directly or via the orchestrator component 230. The text data sent from the ASR component 250 to the NLU component 260 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110 or skill server(s) 125 may send text data 213 to the server(s) 120. Upon receipt by the server(s) 120, the text data 213 may be sent to the orchestrator component 230. The orchestrator component 230 may send the text data 213 to the NLU component 260.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., a device 110, the server(s) 120, the skill server(s) 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "roll up my windows," the NLU component 260 may determine an intent that the system cause the device 110 to roll up its windows.

The NLU component 260 outputs NLU results to the orchestrator component 230. The NLU results may include a representation of a single intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value. The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the server(s) 120 that is akin to a software application running on a traditional computing device. That is, a skill component 290 may enable the server(s) 120 to execute specific functionality in order to perform one or more actions (e.g., provide information to a user, display content to a user, output music, or perform some other requested action). The server(s) 120 may be configured with more than one skill component 290. For example, a weather skill component may enable the server(s) 120 to provide weather information, a ride sharing skill component may enable the server(s) 120 to schedule a trip with respect to a ride sharing service, a restaurant skill component may enable the server(s) 120 to order a pizza with respect to a restaurant's online ordering system, a communications skill component may enable the system to perform messaging or multi-endpoint communications, a device-specific skill may enable the system to perform one or more actions specific to the device 110, etc. A skill component 290 may operate in conjunction between the server(s) 120 and other devices such as a device 110 local to a user or a skill server(s) 125 in order to complete certain functions. Inputs to a skill component 290 may come from various interactions and input sources.

The functionality described herein as a skill or skill component may be referred to using many different terms, such as an action, bot, app, or the like.

A skill component 290 may include hardware, software, firmware, or the like that may be dedicated to the particular skill component 290 or shared among different skill components 290. A skill component 290 may be part of the server(s) 120 (as illustrated in FIG. 2) or may be located at whole (or in part) with one or more separate servers.

Unless expressly stated otherwise, reference to a skill, skill device, or skill component may include a skill component operating within the server(s) 120 (for example as skill component 290) and/or skill component operating within a server(s) separate from the server(s) 120.

A skill component 290 may be configured to perform one or more actions. An ability to perform such action(s) may sometimes be referred to as a "speechlet." That is, a speechlet may enable a skill component 290 to execute specific functionality in order to provide data or produce some other output requested by a user. A particular skill component 290 may be configured to execute more than one speechlet. For example, a weather speechlet may involve a weather skill component providing weather information to the server(s) 120, a ride sharing speechlet may involve a ride sharing skill component scheduling a trip with respect to a ride sharing service, an order pizza speechlet may involve a restaurant skill component ordering a pizza with respect to a restaurant's online ordering system, a windows control speechlet may involve a device-specific skill component causing a vehicle to move its windows, etc.

A system may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, device-specific skills, as well as custom skills that are not associated with any pre-configured type of skill.

The system may be configured with different device-specific skill components (illustrated as part of the skill components 290 in FIG. 2). A device-specific skill component may be specific to a vehicle manufacturer, an appliance manufacturer, or some other device manufacturer that does not control or maintain the server(s) 120.

In certain instances, the server(s) 120 may receive or determine text data responsive to a user input, when it may be more appropriate for audio to be output to a user. The server(s) 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be an umbrella profile specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a single group profile may additionally include preferences specific to the user associated therewith. That is, each user profile may include preferences unique from one or more other user profiles associated with the same group profile. A user profile may be a stand-alone profile or may be associated with a group profile.

A user profile may represent skill components enabled by the user associated with the user profile. The system may be configured such that certain skill components may not be invoked by a user's input unless the user has enabled the skill component. The system may automatically enable a device-specific skill component with respect to a user profile when the user associates a device (itself associated with the device-specific skill component) with the user's profile. For example, if the user associates a vehicle with their user profile, the system may enable the vehicle manufacturer's skill component without a particular user request to do so. The system may hide a device-specific skill component from a user until the user has associated a device (associated with the device-specific skill component) with their user profile. This is because device-specific skill components may be configured to only provide functionality useful to users having devices associated with the device-specific skill components. For example, a particular vehicle manufacturer's skill component may only provide functionality useful to a user having one or more of the vehicle manufacturer's vehicles.

When a user associates a device with their user profile, the user may provide the system with account information (e.g., account number, username, password, etc.). The server(s) 120 (or components thereof) may use the account information to communicate with a skill server(s) 125 associated with the vehicle. The server(s) 120 may be restricted from sending data to or receiving data from a skill server(s) 125 until the server(s) 120 authenticates itself with the skill server(s) 125 using the account information and/or a device identifier specific to the device newly associated with the user profile.

The profile storage 270, or a different storage, may store device profiles. Each device profile may be associated with a different device identifier. Each device profile may represent output capabilities (e.g., audio, video, quality of output, etc.) of the device. Each device profile may also represent a skill component identifier specific to a device-specific skill component associated with the device. For example, if the device 110 is a vehicle, the skill component identifier may represent a vehicle manufacturer skill component associated with the vehicle. For further example, if the device 110 is an appliance, the skill component identifier may represent an appliance manufacturer skill component associated with the appliance.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The server(s) 120 may include a user recognition component 295 that recognizes one or more users associated with data input to the system. The user recognition component 295 may take as input the audio data 211, text data 213, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data including representations of features of different users. The user recognition component 295 may perform additional user recognition processes, including those known in the art. Output of the user recognition component 295 may include a single user identifier corresponding to the most likely user that originated the present input. Alternatively, output of the user recognition component 295 may include an N-best list of user identifiers with respective scores indicating likelihoods of respective users originating the present input. The output of the user recognition component 295 may be used to inform NLU processing as well as processing performed by skill components 290.

Figure 3:
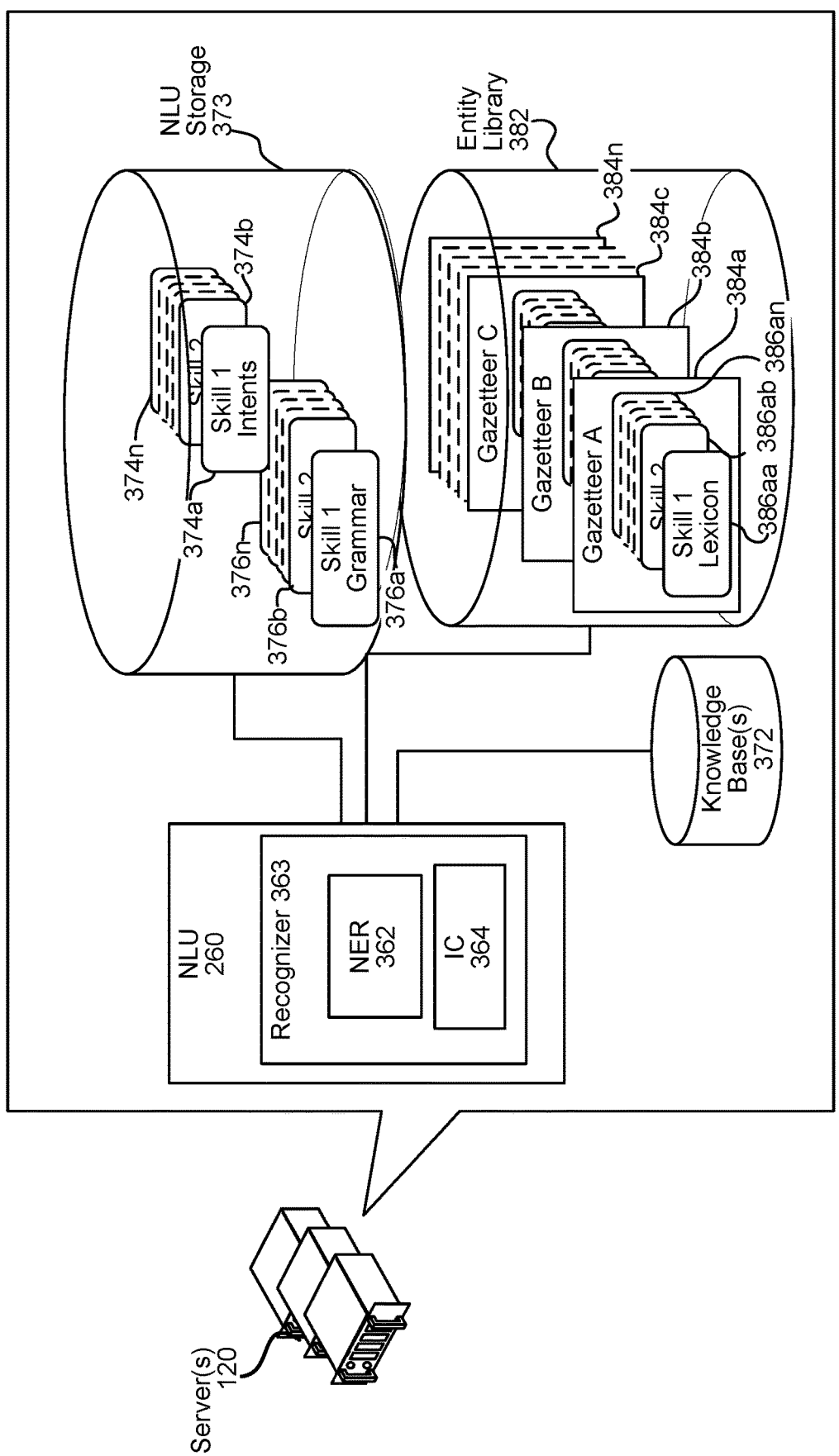
FIG. 3 is a conceptual diagram of how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 125, etc.) to complete that action. For example, if the NLU component 260 receives text data corresponding to "tell me the weather," the NLU component 260 may determine that the user intends the system to output weather information.

The NLU component 260 may process text data including several hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to the top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 363. Each recognizer 363 may be associated with a different skill component 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a skill component 290, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 associated with the skill component 290 (associated with the recognizer 363 implementing the NER component 362) to determine a mention of one or more entities in text data. In this manner, the NER component 362 identifies "slots" (corresponding to one or more particular words in text data) that may be needed for later processing. The NER component 362 may also label each slot with a type (e.g., noun, place, city, artist name, song name, etc.).

Each grammar model 376 includes the names of entities (i.e., nouns) commonly found in speech about the particular skill component 290 to which the grammar model 376 relates, whereas the lexical information 386 is personalized to the user and/or the device 110 from which the user input originated. For example, a grammar model 376 associated with a shopping skill component may include a database of words commonly used when people discuss shopping.

A downstream process called named entity resolution (discussed in detail elsewhere herein) actually links a portion of text data to an actual specific entity known to the system. To perform named entity resolution, the NLU component 260 may utilize gazetteer information (384a-384n) stored in an entity library storage 382. The gazetteer information 384 may be used to match text data with different entities, such as song titles, contact names, etc. Gazetteers 384 may be linked to users (e.g., a particular gazetteer may be associated with a specific user's music collection), may be linked to certain skill components 290 (e.g., a shopping skill component, a music skill component, a video skill component, a device-specific skill component, etc.), or may be organized in a variety of other ways.

Each recognizer 363 may also include an intent classification (IC) component 364. An IC component 364 parses text data to determine an intent(s), associated with the skill component 290 (associated with the recognizer 363 implementing the IC component 364), that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374, associated with the skill component 290 that is associated with the recognizer 363 implementing the IC component 364.

The intents identifiable by a specific IC component 364 are linked to skill-specific (i.e., the skill component 290 associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the skill component 290 associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music skill, which an IC component 364 (also implemented by the music skill recognizer) may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the skill component 290 (in the knowledge base 372). For example, if the text data includes "play songs by the rolling stones," after failing to determine an album name or song name called "songs" by "the rolling stones," the NER component 362 may search the skill vocabulary for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {skill} Music, {intent}<PlayMusic>, {artist name} rolling stones, {media type} SONG, and {song title} mother's little helper. For further example, the NER component 362 may tag "play songs by the rolling stones" as: {skill} Music, {intent}<PlayMusic>, {artist name} rolling stones, and {media type} SONG.

Figure 4:
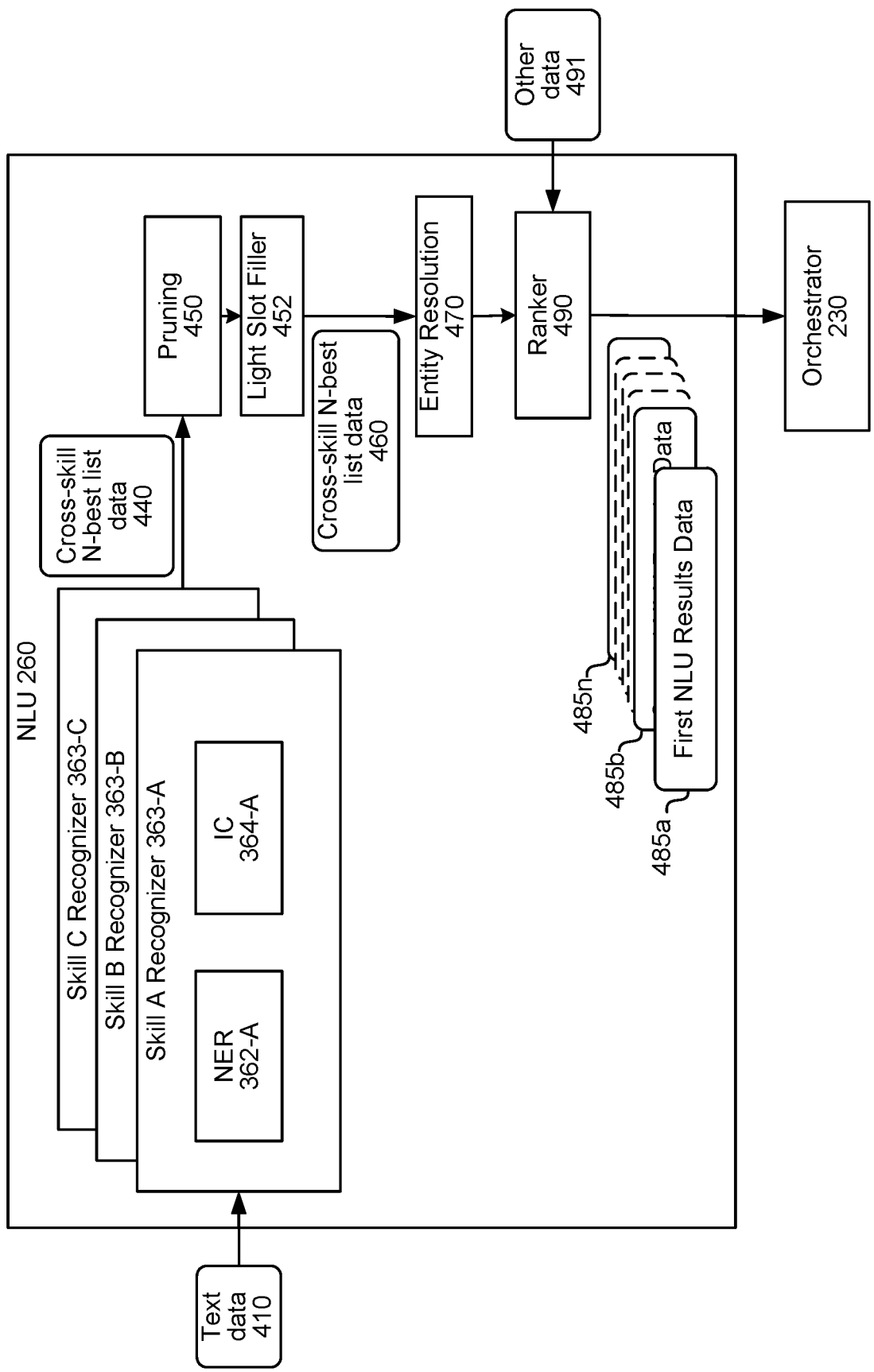
FIG. 4 is a conceptual diagram of how natural language understanding processing is performed according to embodiments of the present disclosure.

The NLU component 260 may generate cross-skill N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots called out by the NER component 362 may be grouped as an NLU hypothesis represented in the cross-skill N-best list data 440. Each NLU hypothesis may also be associated with one or more respective score(s) for the NLU hypothesis. For example, the cross-skill N-best list data 440 may be represented as, with each line representing a separate NLU hypothesis:

[0.95] Intent: <PlayMusic> ArtistName: Lady Gaga SongName: Poker Face
[0.95] Intent: <PlayVideo> ArtistName: Lady Gaga VideoName: Poker Face
[0.01] Intent: <PlayMusic> ArtistName: Lady Gaga AlbumName: Poker Face
[0.01] Intent: <PlayMusic> SongName: Pokerface The NLU component 260 may send the cross-skill N-best list data 440 to a pruning component 450. The pruning component 450 may sort the NLU hypotheses represented in the cross-skill N-best list data 440 according to their respective scores. The pruning component 450 may then perform score thresholding with respect to the cross-skill N-best list data 440. For example, the pruning component 450 may select NLU hypotheses represented in the cross-skill N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-skill N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-skill N-best list data 460.

The NLU component 260 sends the cross-skill N-best list data 460 to an entity resolution component 470. The entity resolution component 470 can apply rules or other instructions to standardize labels or tokens from previous stages into an intent/slot representation. The precise transformation may depend on the skill component 290. For example, for a travel skill component, the entity resolution component 270 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-skill N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-skill N-best list data 460, and that includes more detailed information (e.g., entity IDs) about the specific entities mentioned in the slots and/or more detailed slot data that can eventually be used by a skill component 290. The NLU component 260 may include multiple entity resolution components 470 and each entity resolution component 470 may be specific to one or more skill components 290.

The entity resolution component 470 may not be successful in resolving every entity and filling every slot represented in the cross-skill N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill component includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, or other techniques to determine the top scoring NLU hypotheses. To do so, the ranker component 490 may consider not only the data output by the entity resolution component 470, but may also consider other data 491. The other data 491 may include a variety of information. The other data 491 may include skill component 290 rating or popularity data. For example, if one skill component 290 has a particularly high rating, the ranker component 490 may increase the score of an NLU hypothesis associated with that skill component 290. The other data 491 may also include information about skill components 290 that have been enabled for the user identifier and/or device identifier associated with the current user input. For example, the ranker component 490 may assign higher scores to NLU hypotheses associated with enabled skill components 290 than NLU hypotheses associated with non-enabled skill components 290. The other data 491 may also include data indicating user usage history, such as if the user identifier associated with the current user input is regularly associated with user input that invokes a particular skill component 290 or does so at particular times of day. The other data 491 may additionally include data indicating date, time, location, weather, type of device 110, user identifier, device identifier, context, as well as other information. For example, the ranker component 490 may consider when any particular skill component 290 is currently active (e.g., music being played, a game being played, etc.) with respect to the user or device associated with the current user input. The other data 291 may also include device type information. For example, if the device 110 does not include a display, the ranker component 490 may decrease the score associated with NLU hypotheses that would result in displayable content being presented to a user.

Following ranking by the ranker component 490, the NLU component 260 may output NLU results data 485 to the orchestrator component 230. The NLU results data 485 may include first NLU results data 485a including tagged text data associated with a first skill component 290a, second NLU results data 485b including tagged text data associated with a second skill component 290b, etc. The NLU results data 485 may include the top scoring NLU hypotheses (e.g., in the form of an N-best list) as determined by the ranker component 490. Alternatively, the NLU results data 485 may include the top scoring NLU hypothesis as determined by the ranker component 490.

Prior to the orchestrator component 230 sending text data to the NLU component 260, the orchestrator component 230 may determine whether the device 110 is associated with a device-specific skill component 290. The orchestrator component 230 may use the device identifier, received from the device 110, to determine device profile data associated with the device 110. The orchestrator component 230 may determine the device profile data corresponds to a skill component identifier unique to a device-specific skill component associated with the device 110. Alternatively, the orchestrator component 230 may determine the device profile data represents a manufacturer of the device 110. The orchestrator component 230 may then determine whether the system includes a device-specific skill component associated with the device manufacturer.

If the orchestrator component 230 determines the device 110 is associated with a device-specific skill component, the orchestrator component 230 may call the NLU component 260 twice. The orchestrator component 230 calls the NLU component 260 to perform NLU processing on text data (received from the device 110 or spee skill chlet server(s) 125, or output by the ASR component 250) with respect to multiple (potentially non-device specific) skill components of the system, as described above with respect to FIGS. 3 and 4. The orchestrator component 230 may also separately call the NLU component 260 to perform NLU processing on the text data specifically with respect to the device-specific skill component. The NLU component 260 may perform the foregoing processing at least partially in parallel, and output NLU results of the respective two processing approaches to the orchestrator component 230. The orchestrator component 230 may then rank the received NLU results to determine which skill component should be invoked to execute with respect to the current user input.

Figure 5:
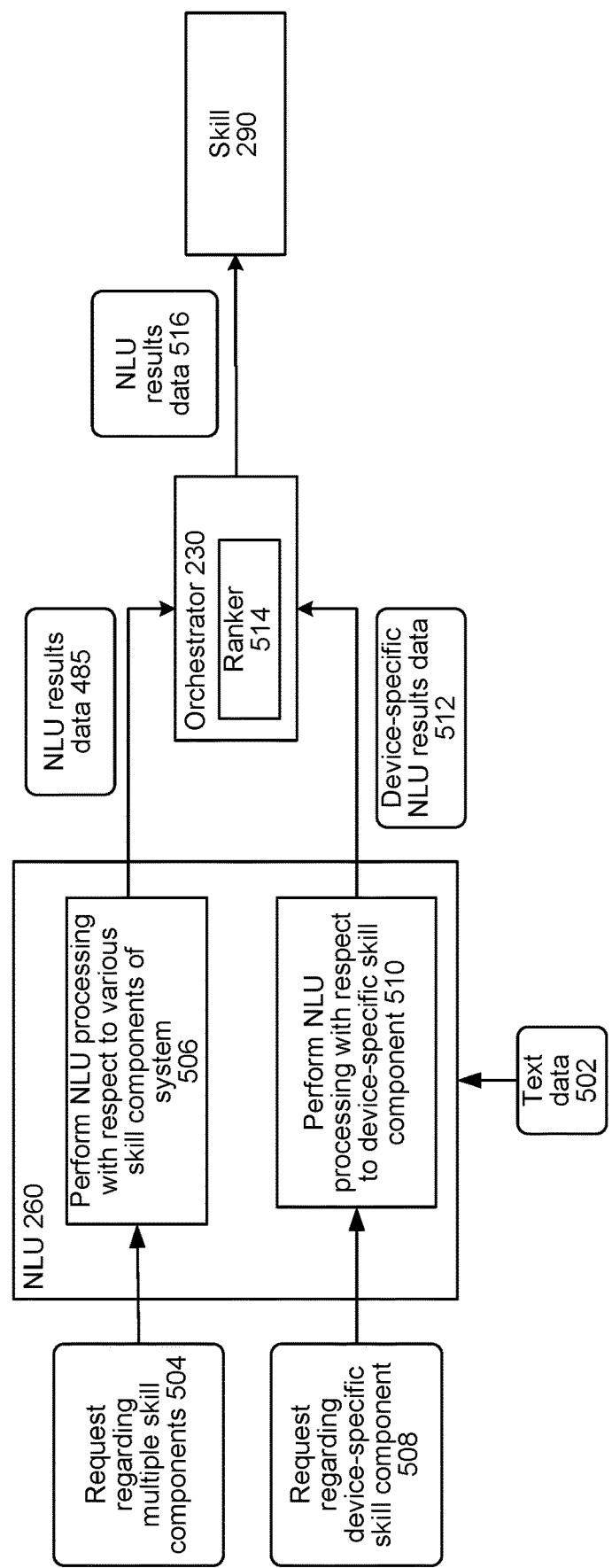
FIG. 5 is a conceptual diagram of how natural language understanding processing is performed when a device is associated with a device-specific skill component according to embodiments of the present disclosure.

FIG. 5 illustrates how the NLU component 260 performs NLU processing when the device 110 is associated with a device-specific skill component 290. The orchestrator component 230 sends text data 502 (received from the device 110 or skill server(s) 125, or output by the ASR component 250) to the NLU component 260.

The orchestrator component 230 also sends a request 504 for the NLU component 260 to perform NLU processing with respect to various skill components of the system. In response, the NLU component 260 performs (506) NLU processing with respect to various skill components of the system as described with respect to FIGS. 3 and 4. As a result of such processing, the NLU component 260 outputs NLU results data 485, which the NLU component 260 sends to the orchestrator component 230.

The orchestrator component 230 also sends a request 508 for the NLU component 260 to perform NLU processing specifically with respect to the device-specific skill component associated with the device 110. The request 508 may include the skill component identifier of the device-specific skill component. In response, the NLU component 260 performs (510) NLU processing specifically with respect to the device-specific skill component. A device-specific skill component may be associated with a pre-established set of intents that can be handled by the device-specific skill component. The set of intents may be established by the device-specific skill component's developer. The NLU component 260 may implement a specific recognizer 363 associated with the device-specific skill component, which may in turn implement a specific NER component 362 and IC component 364.

The orchestrator component 230 may send the requests (504/508) to the NLU component 260 at the same time or substantially at the same time. Simultaneous or substantially simultaneous receipt of the requests (504/508) by the NLU component 260 may cause the NLU component 260 to perform (506) NLU processing (e.g., named entity recognition and intent classification) with respect to various skill components at least partially in parallel to performing (510) NLU processing (e.g., named entity recognition and intent classification) with respect to the device-specific skill component.

The device-specific recognizer may output an N-best list of NLU hypotheses representing only intents that may be processed by the device-specific skill component. The N-best list may be processed by the pruning component 450, light slot filler component 452, entity resolution component 470, and ranker component 490, as described with respect to FIG. 4, to generate device-specific NLU results data 512, which the NLU component 260 sends to the orchestrator component 230. The device-specific NLU results data 512 may include an N-best list of NLU hypotheses. The device-specific NLU results data 512 may also be output by the device-specific recognizer 363 without further operation by other NLU components.

As compared to the NLU processing at step 506, which attempts to determine an intent of the user independent of any particular device-specific skill component, the NLU processing at step 510 attempts to match the text data to an intent handled by the device-specific skill component.

Thus, it will be appreciated that the orchestrator component 230 may receive two different N-best lists of NLU results. One N-best list based on NLU processing with respect to various skill components and one N-best list based on NLU processing performed specifically with respect to the device-specific skill component.

Whereas the NLU component 260 may determine text data relates to more than one potential intent, the orchestrator component 230 may be concerned with narrowing the potential intents to a single intent. Once the orchestrator component 230 has determined the ultimate intent of the user, the orchestrator component 230 may determine the skill component 290 best suited to process with respect to that intent. The orchestrator component 230 may send, to the skill component 290, NLU results data 516 representing the intent of the user and slotted text data that may be used by the skill component 290 to perform an action responsive to the user input.

The orchestrator component 230 may implement a ranker component 514 for determining the ultimate intent of the user. The ranker component 514 may implement one or more rules to determine the intent of the user.

As illustrated in FIG. 5, the NLU component 260 may be called twice, resulting in the NLU component 260 performing NLU processing with respect to various skill components at least partially in parallel to performing NLU processing with respect to the device-specific skill component. One skilled in the art will appreciate that the NLU component 260 may instead receive ASR results and an indicator of the device-specific skill component (e.g., the NLU component 260 may be called once instead of twice). The NLU component's receipt of the ASR results and the device-specific skill component indicator may cause the NLU component 260 to perform NLU processing (e.g., named entity recognition and intent classification) with respect to various skill components at least partially in parallel to performing NLU processing (e.g., named entity recognition and intent classification) with respect to the device-specific skill component associated with the received device-specific skill component indicator.

FIG. 5 also illustrates the NLU component 260 may output two different NLU results, one set of results associated with NLU processing performed with respect to various skill components and one set of results associated with NLU processing performed with respect to the device-specific skill component. The NLU component 260 may alternatively output a single set of NLU results. The ranker 490 of the NLU component 260 may generate a single set of NLU results (e.g., an N-best list of NLU hypotheses) based on both the NLU processing performed with respect to various skill components as well as the NLU processing performed with respect to the device-specific skill component. The single set of NLU results may be sent from the NLU component 260 to the orchestrator component 230 for processing as described above with respect to FIG. 5.

Figure 6:
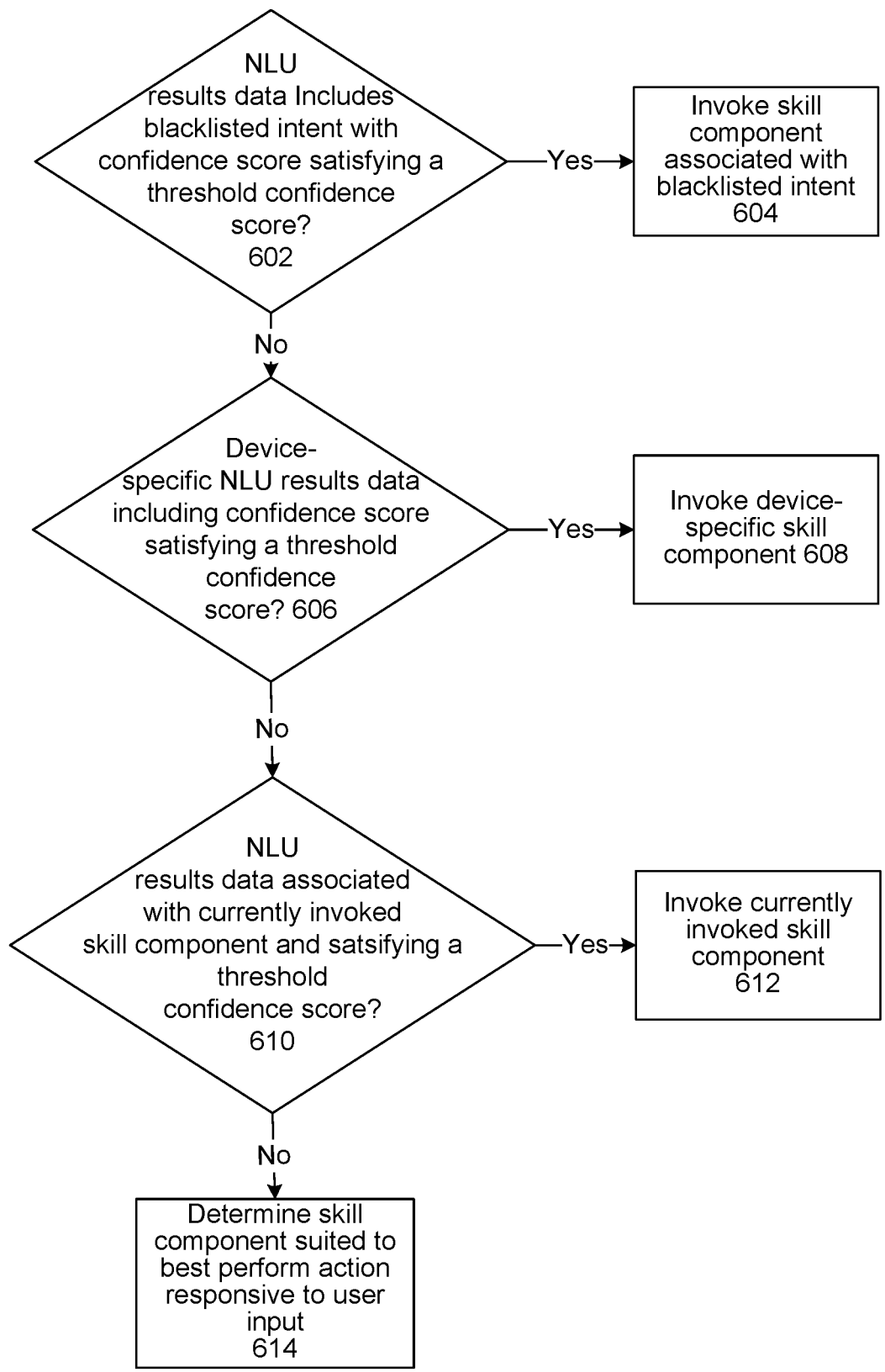
FIG. 6 is a process flow diagram illustrating how an intent of a user may be determined according to embodiments of the present disclosure.

FIG. 6 illustrates how the orchestrator component 230 (and more particularly the ranker component 514) may implement one or more rules to determine the intent of the user. While FIG. 6 illustrates rules are applied in a certain progression, one skilled in the art will appreciate that the rules may be considered in a different progression or the rules may be considered independently and the ranker component 514 may consider results of each rule's application in determining the intent of the user.

The ranker component 514 determines (602) whether the NLU results data 485 includes a blacklisted intent associated with a confidence score that satisfies a threshold confidence score. The system may be configured with a predetermined set of intents that the system does not want a device-specific skill component to handle every time a user input corresponds to an intent of the predetermined set. The system may not want the device-specific skill component to handle every instance of a particular intent because the user may desire another skill component to handle the intent. For example, the system may be configured with a ride sharing skill component associated with a particular ride sharing service. The ride sharing service may be capable of delivering groceries to users. The manufacturer of the device 110 may also include a service that delivers groceries to users. A user may provide an input to the device 110 corresponding to "deliver my groceries on Friday." Without the foregoing determination, since the user input was provided to the device 110, the device-specific skill component associated with the device 110 could "hijack" the user input and be invoked to handle the user input when the user intended the ride sharing service to deliver the groceries. Thus, the foregoing check enables the system to ensure the skill component 290 desired to be invoked by the user is in fact invoked even if the user input is something the device-specific skill component can handle. If the ranker component 514 determines the NLU results data 485 includes a blacklisted intent associated with a confidence score that satisfies a threshold confidence score, the orchestrator component 230 invokes (604) a skill component 290 (not the device-specific skill component) associated with the blacklisted intent to perform an action responsive to the user input.

If the ranker component 514 determines the NLU results data 485 does not include a blacklisted intent associated with a confidence score that satisfies a threshold confidence score, the ranker component 514 may determine (606) whether the device-specific NLU results data 512 includes an NLU hypothesis associated with a confidence score satisfying a threshold confidence score. If the ranker component 514 determines the device-specific NLU results data 512 includes an NLU hypothesis associated with a confidence score satisfying a threshold confidence score, the orchestrator component 230 invokes (608) the device-specific skill component to perform an action responsive to the user input.

If the ranker component 514 determines the device-specific NLU results data 512 does not include at least one NLU hypothesis associated with a confidence score satisfying a threshold confidence score, the ranker component 514 may determine (610) whether the NLU results data 485 represents an NLU hypothesis associated with a currently invoked skill component and associated with a confidence score satisfying a threshold confidence score. A currently invoked skill component may be a skill component that was invoked by a previous user input and that is still providing content to the user when the current user input is received. For example, a user may have previously said "play Adele music." A music skill component may have been invoked to provide Adele music to the user. When the current user input was received, the music skill component may still be providing Adele music to the user. In the foregoing example, the music skill component would be considered a currently invoked skill component. Since the user is currently invoking a skill component, the system may be configured to have the currently invoked skill component handle the present user input if the currently invoked skill component is associated with an NLU hypothesis the system is rather confident in. Thus, if the ranker component 514 determines the NLU results data 485 represents an NLU hypothesis associated with a currently invoked skill component and associated with a confidence score satisfying a threshold confidence score, the orchestrator component 230 invokes (612) the currently invoked skill component to perform an action responsive to the user input.

If the ranker component 514 determines the NLU results data 485 does not represent an NLU hypothesis associated with a currently invoked skill component and associated with a confidence score satisfying a threshold confidence score, the orchestrator component 230 may determine (614) a skill component 290 suited to best perform an action responsive to the user input.

The orchestrator component 230 may determine a highest scoring NLU hypothesis of both the NLU results data 485 and the device-specific NLU results data 512, and invoke the skill component 290 associated with the highest scoring NLU hypothesis. This approach may not be beneficial in some instances (e.g., a difference between the top scoring NLU hypothesis' score and the second top scoring NLU hypothesis' score is less than a threshold difference).

Figure 7:
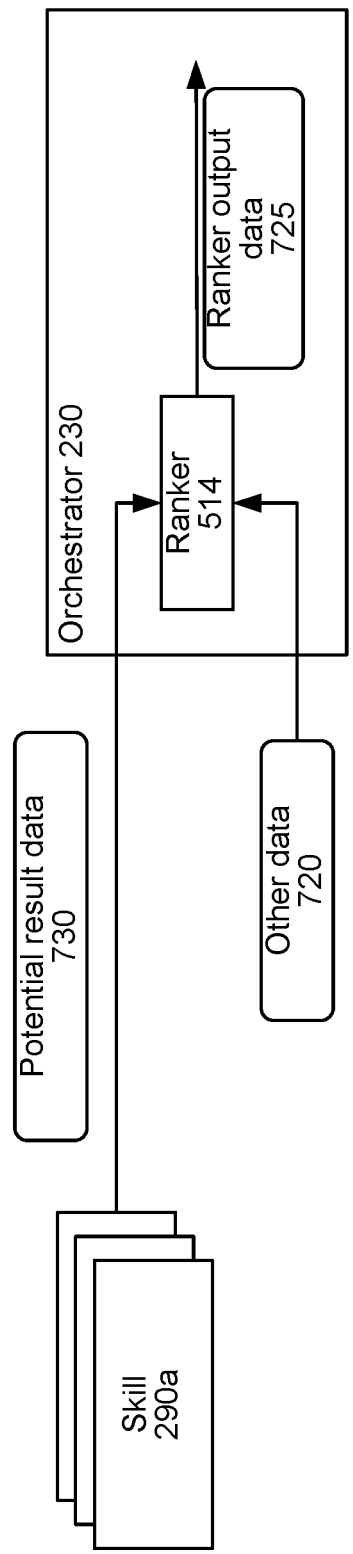
FIG. 7 is a conceptual diagram of how a skill may be determined to handle a user input according to embodiments of the present disclosure.

FIG. 7 illustrates how the orchestrator component may disambiguate close NLU scores. The orchestrator component 230 may solicit the top scoring skill components to indicate how they would respond to their respective NLU hypotheses, without actually performing any responsive action. The orchestrator component 230 may operate one or more trained models that are configured to process NLU results data, results data provided by skill components, and other data to determine the skill component best suited to perform an action responsive to the user input.

The system may be configured with thousands, tens of thousands, etc. skill components 290. The orchestrator component 230 determines the best skill component 290 to execute the user input. For example, a top scoring NLU hypothesis may correspond or substantially correspond to a second top scoring NLU hypothesis, even though the top scoring NLU hypothesis is associated with a first skill component and the second top scoring NLU hypothesis is associated with a second skill component. The top scoring NLU hypothesis may be associated with a first confidence score indicating the system's confidence with respect to NLU processing performed to generate the top scoring NLU hypothesis. The second top scoring NLU hypothesis may be associated with a second confidence score indicating the system's confidence with respect to NLU processing performed to generate the second top scoring NLU hypothesis. The first confidence score may be similar or identical to the second confidence score.

The orchestrator component 230 may solicit the first skill component and the second skill component to provide potential results data 730 based on their respective NLU hypotheses. For example, the orchestrator component 230 may send the top scoring NLU hypothesis to the first skill component along with a request for the first skill component to at least partially execute with respect to the top scoring NLU hypothesis. The orchestrator component 230 may also send the second top scoring NLU hypothesis to the second skill component along with a request for the second skill component to at least partially execute with respect to the second top scoring NLU hypothesis. The orchestrator component 230 receives, from the first skill component, first potential results data generated from the first skill component's execution with respect to the top scoring NLU hypothesis. The orchestrator component 230 also receives, from the second skill component, second potential results data generated from the second skill component's execution with respect to the second top scoring NLU hypothesis.

The ranker component 514 may consider the first potential results data and the second potential results data to alter the first confidence score and the second confidence score of the top scoring NLU hypothesis and the second top scoring NLU hypothesis, respectively. That is, the ranker component 514 may generate a third confidence score based on the first potential results data and the first confidence score. The third confidence score may represent the ranker component's confidence that the first skill component should ultimately be invoked to perform an action responsive to the user input. The ranker component 514 may also generate a fourth confidence score based on the second potential results data and the second confidence score. The fourth confidence score may represent the ranker component's confidence that the second skill component should ultimately be invoked to perform an action responsive to the user input. One skilled in the art will appreciate that a difference between the third confidence score and the fourth confidence score may be greater than a difference between the first confidence score and the second confidence score.

The ranker component 230 may also consider other data 720 to generate the third confidence score and the fourth confidence score. The other data may include rankings associated with the skill components, whether the user that originated the user input has enabled one or more skill components, output capabilities of a device 110 that will be used to output content responsive to the user input, information indicated a veracity of the potential results data provided by a skill component, information indicating a type of device 110 the user interacted with to provide the system with the user input, a location of the device 110 and/or user, a time day, user preferences, system usage history associated with the user, a speed of motion of the device 110, how long it took a skill component to provide potential results data to the orchestrator component 230, etc. The ranker component 514 may output data 725 representing the updated confidence scores and associated skill components.

The orchestrator component 230 may invoke the skill component, associated with the top scoring disambiguated NLU hypothesis represented in the data 725, to perform an action responsive to the user input. Alternatively, if only one skill component, of many skill components queried to provide potential results data, actually provides potential results data, the orchestrator component 230 may invoke the skill component that provided the potential results data to perform an action responsive to the user input.

It has been described that the ranker component 514 uses other data 720 to increase and decrease scores associated with various skill components that the orchestrator component 230 has already requested potential results data from. Alternatively, the ranker component 514 may use other data 720 to determine which skill components to request potential results data from.

While it has been described that the ranker component 514 may alter the confidence scores associated with first and second skill components, one skilled in the art will appreciate that the ranker component 514 may alter the confidence scores of more than two skill components.

The orchestrator component 230 may implement one or more trained models. The trained model(s) implemented by the orchestrator component 230 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

It has been described that the NLU component 260 is called twice. Once to executed with respect to various skill components of the system and once to execute with respect to a particular device-specific skill component. Alternatively, one skilled in the art will appreciate that the NLU component 260 may be called once. In this situation, the NLU component 260 may execute with respect to various skill components of the system, including the device-specific skill component, and use information about the device 110 to adjust NLU confidence scores. The output of this NLU processing may then be processed using the teachings of FIGS. 6 and 7 to determine which skill component should be invoked.

Instead of calling the NLU component 260 twice, resulting in the NLU component 260 performing NLU processing with respect to various skill components in parallel with performing NLU processing with respect to the device-specific skill component, the system may call the NLU component 260 to perform NLU processing with respect to only the device-specific skill component in the first instance. The system may then determine whether the NLU results of the device-specific skill component NLU processing include a confidence value that satisfies a threshold confidence value. If the confidence value satisfies the threshold confidence value, the system may invoke the device-specific skill component. If the confidence value does not satisfy the threshold confidence value, the system may then call the NLU component 260 to perform NLU processing with respect to various skill components of the system. This approach would result in the NLU processing performed with respect to various skill components of the system being performed in series with the NLU processing performed with respect to the device-specific skill component. While this approach may result in increased latency in certain situations, this approach may result in reduced latency in other situations.

As used herein, a confidence score, or other score, may be a numeric value (e.g., on a scale of 0 to 1) or may be a binned value (e.g., high, medium, low). Likewise, a threshold score may be a numeric value or binned value.

After the orchestrator component 230 invokes the skill component 290, the skill component 290 may determine an action responsive to the user input and send data representing the action to the orchestrator component 230. The orchestrator component 230 may then cause the device 110 to perform the action. Alternatively, after the skill component 290 is invoked by the orchestrator component 230, the skill component 290 may cause the device 110 to perform the action responsive to the user input.

FIG. 8 is a block diagram conceptually illustrating a device 110 that may be used with the system. FIG. 9 is a block diagram conceptually illustrating example components of a remote device, such as the server(s) 120 or skill server(s) 125, which may assist with ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120125) may be included in the system, such as one or more servers 120 for performing ASR processing, one or more servers 120 for performing NLU processing, one or more skill servers 125 for performing actions responsive to user inputs and well as for performing intermediary actions between the device 110 and the server(s) 120, etc. In operation, each of these devices (or groups of devices) may include computer-readable and computer-executable instructions that reside on the respective device (110/120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, server(s) 120, or skill server(s) 125 may include their own dedicated processors, memory, and/or storage. Alternatively, one or more of the components of the device(s) 110, server(s) 120, or skill server(s) 125 may utilize the I/O interfaces (802/902), processor(s) (804/904), memory (806/906), and/or storage (808/908) of the device(s) 110 server(s) 120, or skill server(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, server(s) 120, and skill server(s) 125, as described herein, are illustrative, and may be located as a stand-alone device or may be included, in whole or in part, as a component of a larger device or system.

As illustrated in FIG. 10, multiple devices (110a-110k, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, smart television 110g, and/or appliances (e.g., a washer and/or dryer 110h, a toaster 110i, a refrigerator 110j), and/or a thermostat 110k may be connected to the network(s) 199 through a wireless service provider, over a WiFi or cellular network connection, or the like. Other devices are included as network-connected support devices, such as the server(s) 120, the communications server(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   receiving, from a device, first data representing a first user input;
   determining a device type corresponding to the device;
   determining a first processing component associated with the device type, the first processing component configured to process natural language understanding (NLU) results data;
   based at least in part on the first processing component corresponding to the device type:
     performing first NLU processing of the first user input to determine first NLU results data capable of being processed by at least a second processing component, and
     performing second NLU processing of the first user input to determine second NLU results data capable of being processed by the first processing component; and
   sending the second NLU results data to the first processing component, the first processing component configured to process the second NLU results data to perform an action responsive to the first user input.

2. The method of claim 1, further comprising:
   determining an intent represented in the second NLU results data;
   determining the intent is missing from a pre-established list of intents to be prevented from being processed by the first processing component; and
   sending the second NLU results data to the first processing component based at least in part on determining the intent is missing from the pre-established list of intents.

3. The method of claim 1, further comprising:
   determining the device was outputting content to a user when the device received the first user input; and
   sending the second NLU results data to the first processing component based at least in part on determining the device was outputting the content to the user when the device received the first user input.

4. The method of claim 1, further comprising:
   performing the first NLU processing to determine the first NLU results data to be associated with a first confidence value;
   performing the second NLU processing to determine the second NLU results data to be associated with a second confidence value; and
   sending the second NLU results data to the first processing component based at least in part on the second confidence value and the first confidence value.

5. The method of claim 1, wherein the first data is audio data representing speech and wherein the method further comprises:
   generating automatic speech recognition (ASR) output data representing the speech;
   performing the first NLU processing on the ASR output data to generate the first NLU results data; and
   performing the second NLU processing on the ASR output data to generate the second NLU results data.

6. The method of claim 1, further comprising performing the second NLU processing at least partially in parallel to performing the first NLU processing.

7. The method of claim 1, further comprising:
   determining device profile data associated with the device; and
   determining the device profile data indicates the first processing component.

8. The method of claim 1, wherein the first NLU results data and the second NLU results data are received as part of a same N-best list of NLU results data.

9. The method of claim 1, further comprising:
   sending, to an orchestrator component, the first NLU results data and the second NLU results data; and
   determining, by the orchestrator component, that a confidence value, associated with the second NLU results data, satisfies a threshold confidence value,
   wherein the orchestrator component sends the second NLU results data to the first processing component based at least in part on determining the confidence value satisfies the threshold confidence value.

10. The method of claim 1, further comprising:
    receiving second data representing a result of processing of the second NLU results data by the first processing component;
    receiving third data representing a result of processing of the first NLU results data by the at least second processing component; and
    sending the second NLU results data to the first processing component based at least in part on the second data and the third data.

11. A system, comprising:
    at least one processor; and
    at least one memory comprising instructions that, when executed by the at least one processor, cause the system to:
      receive, from a device, first data representing a first user input;
      determine a device type corresponding to the device;
      determine a first processing component associated with the device type, the first processing component configured to process natural language understanding (NLU) results data;
      based at least in part on the first processing component corresponding to the device type:

perform first NLU processing of the first user input to determine first NLU results data capable of being processed by at least a second processing component, and perform second NLU processing of the first user input to determine second NLU results data capable of being processed by the first processing component; and send the second NLU results data to the first processing component, the first processing component configured to process the second NLU results data to perform an action responsive to the first user input.

12. The system of claim 11, wherein the at least one memory further comprises instructions that, when executed by the at least one processor, further cause the system to:

determine an intent represented in the second NLU results data;

determine the intent is missing from a pre-established list of intents to be prevented from being processed by the first processing component; and send the second NLU results data to the first processing component based at least in part on determining the intent is missing from the pre-established list of intents.

13. The system of claim 11, wherein the at least one memory further comprises instructions that, when executed by the at least one processor, further cause the system to:

determine the device was outputting content to a user when the device received the first user input; and send the second NLU results data to the first processing component based at least in part on determining the device was outputting the content to the user when the device received the first user input.

14. The system of claim 11, wherein the at least one memory further comprises instructions that, when executed by the at least one processor, further cause the system to:

perform the first NLU processing to determine the first NLU results data to be associated with a first confidence value;

perform the second NLU processing to determine the second NLU results data to be associated with a second confidence value; and send the second NLU results data to the first processing component based at least in part on the second confidence value and the first confidence value.

15. The system of claim 11, wherein the first data is audio data representing speech and wherein the at least one memory further comprises instructions that, when executed by the at least one processor, further cause the system to:

generate automatic speech recognition (ASR) output data representing the speech;

perform the first NLU processing on the ASR output data to generate the first NLU results data; and perform the second NLU processing on the ASR output data to generate the second NLU results data.

16. The system of claim 11, wherein the at least one memory further comprises instructions that, when executed by the at least one processor, further cause the system to perform the second NLU processing at least partially in parallel to performing the first NLU processing.

17. The system of claim 11, wherein the at least one memory further comprises instructions that, when executed by the at least one processor, further cause the system to:

determine device profile data associated with the device; and determine the device profile data indicates the first processing component.

18. The system of claim 11, wherein the first NLU results data and the second NLU results data are received as part of a same N-best list of NLU results data.

19. The system of claim 11, wherein the at least one memory further comprises instructions that, when executed by the at least one processor, further cause the system to:

send, to an orchestrator component, the first NLU results data and the second NLU results data; and determine, by the orchestrator component, that a confidence value, associated with the second NLU results data, satisfies a threshold confidence value, wherein the orchestrator component sends the second NLU results data to the first processing component based at least in part on determining the confidence value satisfies the threshold confidence value.

20. The system of claim 11, wherein the at least one memory further comprises instructions that, when executed by the at least one processor, further cause the system to:

receive second data representing a result of processing of the second NLU results data by the first processing component;

receive third data representing a result of processing of the first NLU results data by the at least second processing component; and send the second NLU results data to the first processing component based at least in part on the second data and the third data.

* * * * *